United States Patent Office 3,405,335
Patented Oct. 8, 1968

3,405,335
ZERO-DRIFT COMPENSATION DEVICE FOR SELF-BALANCING MOTOR DRIVEN INSTRUMENTS
Fumiyuki Inose, Hachioji-shi, Kenichi Isoda, Kokubunji-machi, and Toshio Numakura and Masaharu Nishimura, Kodaira-shi, Japan, assignors to Kabushiki Kaisha Hitachi Seisakusho, Chiyoda-ku, Tokyo-to, Japan, a joint-stock company of Japan
Filed July 1, 1964, Ser. No. 379,475
Claims priority, application Japan, July 4, 1963, 38/34,391
1 Claim. (Cl. 318—18)

ABSTRACT OF THE DISCLOSURE

A self-balance device for use e.g., in a self-balancing recorder, which automatically compensates for zero point fluctuations of recorder indications caused by influences such as thermoelectric force of the input circuit or induction from a power transformer or servomotor. The unbalance voltage of a reference voltage and a measured voltage are amplified and applied to a servomotor, and a main potentiometer balanced by a contact connected to the servomotor; the input is periodically shorted, and a compensation potentiometer coupled to the servomotor; the output drift voltage is determined in the potentiometer, and the output voltage of the latter applied so as to cancel the drift voltage.

Figure 1:
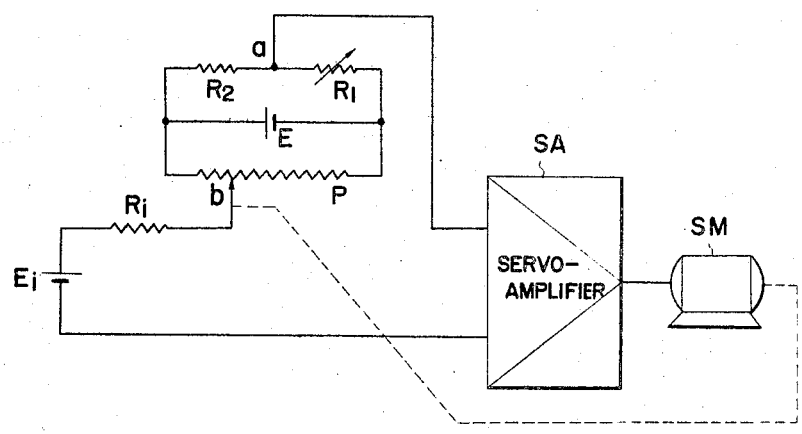

This invention relates to self-balancing instruments, and more particularly it relates to a new and improved zero-drift compensation device which automatically compensates for zero point fluctuations of recorder indication due to causes such as thermal electromotive force of the input circuit, induction due to components such as the power transformer or a servomotor, and drift of a DC-AC converter in a self-balancing instrument such as a self-balancing recorder.

It is an object of the present invention to provide a zero-drift compensation device of the above stated character which is capable of automatically compensating for indication errors occurring in conventional self-balancing instruments as will be described more fully hereinafter.

It is another object to provide a compensation device of the above stated character which can be made at low cost and has high reliability.

The nature, principle, and details of the invention will be best understood by reference to the following description, taken in conjunction with the accompanying drawings in which like parts are designated by like reference characters, and in which:

FIGURE 1 is a schematic diagram showing one example of a conventional self-balancing instrument; and FIGURES 2, 3, 4 and 5 are schematic diagrams respectively showing embodiments of the compensation device according to the invention.

In order to indicate fully the nature of the error which this invention contemplates eliminating, the following brief consideration of an example of a conventional self-balancing instrument is presented.

Referring to FIGURE 1, the conventional self-balancing instrument shown therein comprises, essentially: an input voltage source $E_i$, an input resistance $R_i$, a potentiometer P having a movable contact which is connected in series with the resistance $R_i$ to one terminal of the input voltage source $E_i$ and is coupled to a servomotor SM; a bridge circuit formed by the potentiometer P, a variable resistance $R_1$ for adjusting the zero point, and a resistance $R_i$; a reference voltage source E connected across the fixed terminals of the potentiometer P; and a servo-amplifier SA having an input side connected to the junction between the resistances $R_1$ and $R_2$ and to the other terminal of the input voltage source $E_i$, and having an output side connected to the servomotor SM.

By this circuit arrangement, the difference voltage of the voltage produced by the reference voltage E at the terminals designated by characters $a$ and $b$ of the said bridge circuit and the input source voltage $E_i$ is amplified by the servo-amplifier SA. The servomotor SM is driven by the output of the servo-amplifier SA to cause the said difference voltage to become zero. However, if thermal electromotive force is generated or induction noise is picked up within the servo-amplifier and in the input circuit as above mentioned, the resulting voltage will become superimposed on the input voltage, thereby giving rise to indication error.

The present invention contemplates the elimination of the above mentioned error by a novel device for automatic compensation for such error.

Figure 2:
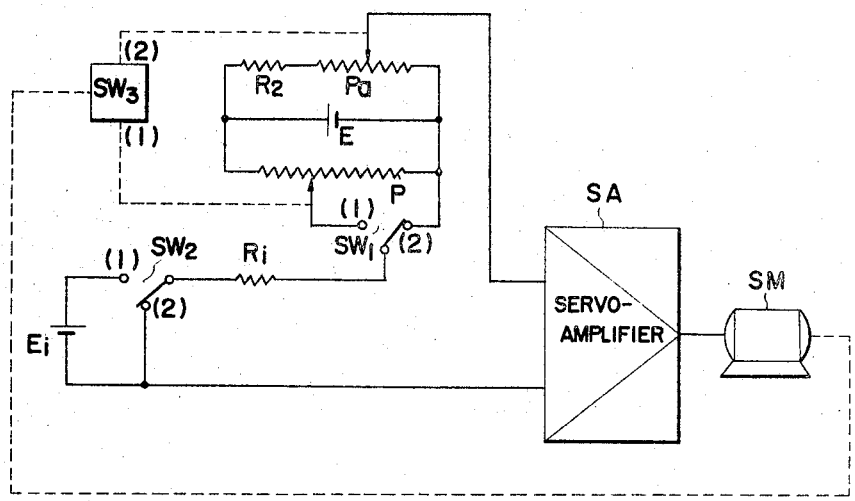

In one embodiment of this device according to the invention as illustrated in FIGURE 2, there are provided an input voltage source $E_i$, an input resistance $R_i$, a potentiometer P, a resistance $R_2$, a servo-amplifier SA, and a servomotor SM constituting components of the automatic self-balancing circuit as described hereinbefore. The circuit according to the invention, however, is additionally provided with a compensation potentiometer $P_a$ constituting a part of the bridge circuit of the device illustrated, switches $SW_1$ and $SW_2$ for shorting the input, and a switch $SW_3$ for selectively switching the potentiometer to be coupled to the aforementioned servomotor SM.

In the operation of the above described device for the purpose of carrying out measurements, the change-over switches $SW_1$, $SW_2$, and $SW_3$ are first placed in contact on their respective (2) sides, whereupon the output of the compensation potentiometer $P_a$ and total drift of the input circuit becomes balanced, and the slider of the potentiometer $P_a$ stops. Then, when the switches $SW_1$, $SW_2$, and $SW_3$ are switched over to their respective (1) sides, the total drift of the input circuit superposed on the input voltage is compensated for by the potentiometer $P_a$. As a result the indication of the recorder (not shown) corresponds to only the input voltage without any relationship to disturbances such as thermal electromotive force and induction noise.

Figure 3:
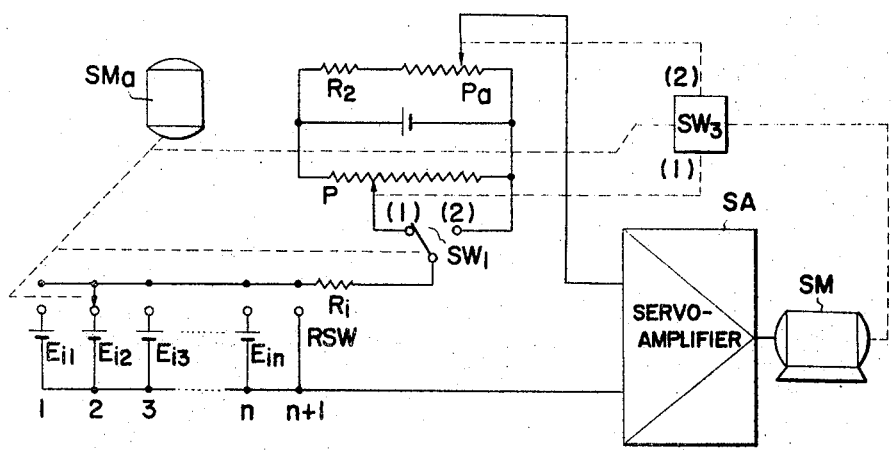

The application of the device of this invention to a multiple-point type self-balancing recorder is illustrated by another embodiment of the invention as shown in FIGURE 3. In this device there are provided a plurality of input sources $E_{i1}$, $E_{i2}$ ... $E_{in}$, a rotary switch RSW, and a synchronous motor $SM_a$ in addition to the parts aforedescribed in connection with the device shown in FIGURE 2. While the rotary switch RSW is operating through points 1 through $n$, inclusive, the switches $SW_1$ and $SW_3$ are placed on their respective (1) sides and are switched to their (2) sides when the rotary switch RSW is at the point $n+1$.

By this arrangement, since compensation is accomplished periodically and automatically, the reduction of erroneous indication due to drift is caused to be even more positive and reliable.

For the switch $SW_3$, means such as a spring clutch, a mechanical friction disk, or a magnetic clutch may be used. Furthermore, the potentiometer P may be always coupled to the servomotor SM, and only the other compensation potentiometer $P_a$ arranged to be switched on and off by the switch $SW_3$.

Figure 4:
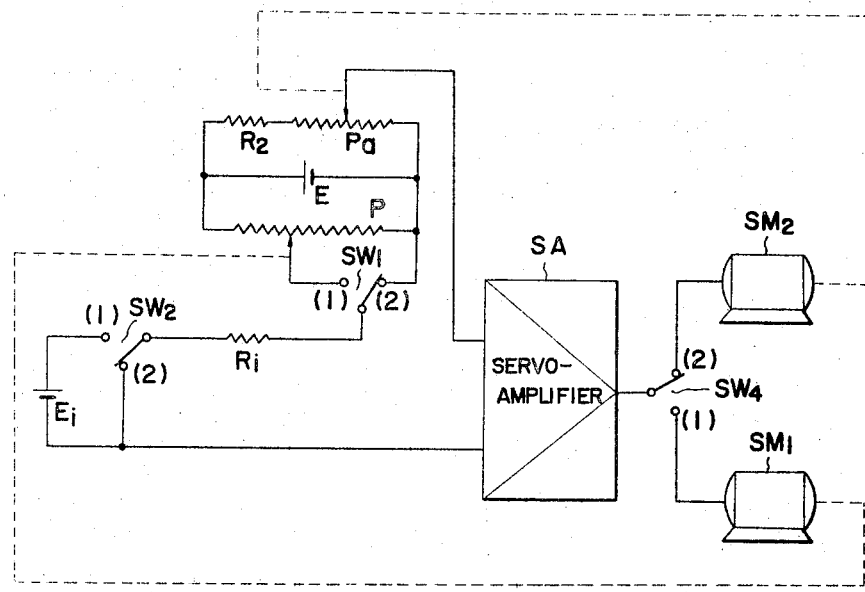

In still another embodiment of the invention as shown in FIGURE 4, the mechanical switch $SW_3$ in the circuit shown in FIGURE 2 is replaced by a purely electrical switch. That is, in place of the switch $SW_3$, a servomotor $SM_2$ and an electrical switch $SW_4$ are used. The servomotor $SM_1$ in FIGURE 4 is the same as the servomotor SM shown in FIGURE 2. In this arrangement, the servomotor $SM_1$ is coupled mechanically to only the contact of the potentiometer P, and the servomotor $SM_2$ is coupled to the contact of the compensation potentiometer $P_a$.

When the switches $SW_1$, $SW_2$, and $SW_4$ are switched to their respective (2) sides, drift compensation is accomplished, and when they are switched to their respective (1) sides, drift compensation is accomplished, and then automatic balancing with the input is carried out. It will be apparent that a similar arrangement can be applied also to a multiple input self-balancing recorder as illustrated in FIGURE 3.

Figure 5:
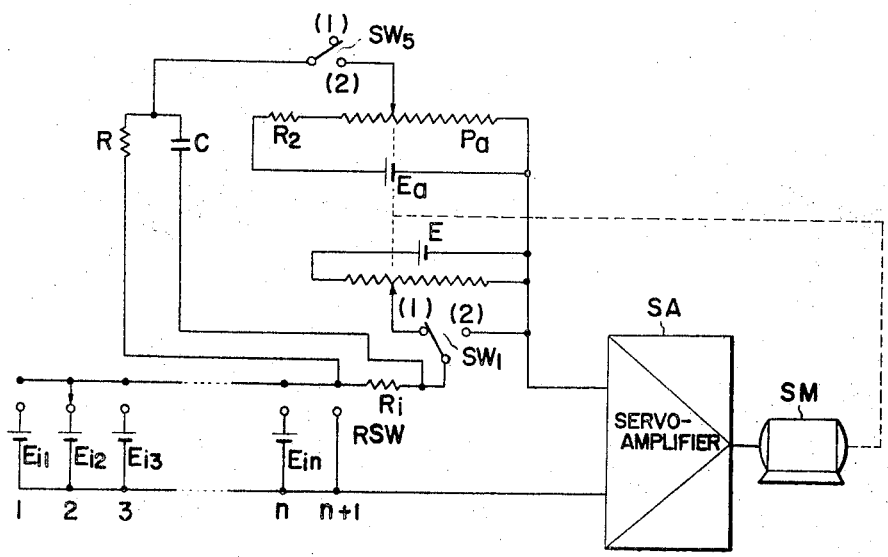

A further embodiment of the invention as shown in FIGURE 5 illustrates an example wherein the mechanical operation of the change-over switch $SW_3$ is accomplished electrically. The device is provided, in addition to the parts of the device shown in FIGURE 3, a resistance R and a capacitor C, the time constant RC of which must be selected to be a high value. There are further provided a power source $E_a$ for the compensation potentiometer $P_a$ and a switch $SW_5$ for opening and closing the circuit of the potentiometer $P_a$.

When the rotary switch RSW is in the position of $n+1$, the switches $SW_1$ and $SW_5$ are in their (2) positions. Consequently, the compensation potentiometer $P_a$ is so driven that the total drift of the input circuit becomes equal to the terminal voltage of the resistance $R_1$. At this time, the capacitor C is charged by the output voltage of the potentiometer $P_a$.

Then, when the rotar switch RSW operates over the points 1 through $n$, the switches $SW_1$ and $SW_5$ are placed on their respective (1) sides. Consequently, the charge stored in the capacitor C is discharged slowly through the resistances R and $R_1$, and it is possible to compensate for the total drift by the terminal voltage of the resistance $R_1$. In this case, it is necessary to select an amply high value of the time constant of the charging circuit as mentioned hereinbefore. Furthermore, since the compensation voltage becomes a value having the ratio $R_i/R+R_i$ to the output voltage of the potentiometer $P_a$, it is necessary that the voltage of its power source $E_a$ be considerably high.

As described above, by the device of this invention, it is possible to obtain automatic compensation for indication errors due to drift even when, for example, a servo-amplifier with a large drift and an input circuit with high thermal electromotive force are used. For this reason, an element with high performance need not be used for the servo-amplifier, especially for the DC-AC converter. Accordingly, the device can be economically produced and yet have high reliability.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claim.

We claim:

1. A self-balancing type measuring device for measurement of input voltages which comprises a servomotor; a servo-amplifier connected thereto; a plurality of input sources connected to said servo-amplifier; a rotary switch disposed therebetween; a first potentiometer coupled to said servo-amplifier and, also to said input sources, the latter by way of first switch means cooperating with said rotary switch; a second potentiometer connected to said first potentiometer and selectively coupled to a capacitor and a first resistance in series therewith; second switch means, cooperating with said rotary switch, interposed between said second potentiometer and said capacitor and first resistance; both said capacitor and first resistance being connected to said input sources and separated from each other by a second resistance; and power supply leads from said servomotor to said first and second potentiometers.

References Cited

UNITED STATES PATENTS

| | | |
|---|---|---|
| 2,473,334 | 6/1949 | Greenwood. |
| 2,483,364 | 9/1949 | Ehret. |
| 2,489,999 | 11/1949 | Cherry. |
| 2,704,822 | 3/1955 | Miller. |
| 2,894,185 | 7/1959 | Chope et al. |

ORIS L. RADER, *Primary Examiner.*

T. LYNCH, *Assistant Examiner.*